(12) United States Patent
Morris

(10) Patent No.: US 6,595,575 B2
(45) Date of Patent: Jul. 22, 2003

(54) PROTECTIVE AND DECORATIVE VEHICLE BODY PANELS

(76) Inventor: Mike Morris, 10567 Peach Tree La., Rancho Cucamonga, CA (US) 91737

( * ) Notice: Subject to any disclaimer, the term of this patent is extended or adjusted under 35 U.S.C. 154(b) by 0 days.

(21) Appl. No.: 09/963,322

(22) Filed: Sep. 25, 2001

(65) Prior Publication Data

US 2003/0057729 A1 Mar. 27, 2003

(51) Int. Cl.[7] .............................................. B60R 13/04
(52) U.S. Cl. ....................... 296/136; 296/191; 280/770
(58) Field of Search ................................. 296/136, 183, 296/185, 191, 152, 39.1, 146.5, 146.1, 148; 280/770; D12/196

(56) References Cited

U.S. PATENT DOCUMENTS

| | | | |
|---|---|---|---|
| 2,474,991 A | * 7/1949 | Stephenson et al. | 296/191 |
| 2,583,781 A | * 1/1952 | Lindsay | 296/191 |
| 3,869,332 A | * 3/1975 | Loew | D12/196 |
| 4,968,084 A | * 11/1990 | Asher et al. | 280/770 |
| 4,974,892 A | * 12/1990 | Huard | 280/770 |
| 5,044,688 A | * 9/1991 | Jacobson | 296/136 |
| 5,271,338 A | 12/1993 | Bonham | |
| 5,549,938 A | * 8/1996 | Nesbitt | 428/17 |
| 5,658,652 A | 8/1997 | Sellergren | |
| 5,673,960 A | * 10/1997 | Sorensen | 296/136 |
| 5,738,403 A | * 4/1998 | Tyson | 296/136 |
| 5,762,394 A | 6/1998 | Salmoniowicz et al. | |
| 5,879,045 A | * 3/1999 | Logan | 296/136 |
| 5,931,522 A | * 8/1999 | Roskey | 296/136 |
| 5,984,401 A | * 11/1999 | Hannah | 296/136 |
| 6,017,079 A | * 1/2000 | Warner | 296/136 |
| 6,136,415 A | 10/2000 | Spengler | |
| 6,286,885 B1 | * 9/2001 | Ramos | 296/57.1 |
| 6,315,327 B1 | * 11/2001 | Woolsey | 280/770 |
| D461,151 S | * 8/2002 | Morris | D12/196 |
| D467,848 S | * 12/2002 | Carroll | D12/196 |

* cited by examiner

*Primary Examiner*—D. Glenn Dayoan
*Assistant Examiner*—Greg Blankenship

(57) ABSTRACT

An aftermarket kit comprised of protective and decorative vehicle body panels for attachment to existent vehicle body structures. The panels include a rigid, resilient substrate layer, such as ABS, to provide increased resistant of a vehicle provided with the panels to damage from impacts with other objects. The panels also include a decorative layer visible through an overlying protective layer. The decorative layer provides the appearance of desirable materials, such as wood or carbon fiber and, in certain versions, includes wood and/or carbon fiber material. The protective layer provides increased resistance of the panels to damage from impinging ultraviolet radiation. The panels can optionally be formed in complex three-dimensional concave and convex curves to provide additional aesthetic appeal and to better conform to complex vehicle contours.

12 Claims, 4 Drawing Sheets

PROTECTIVE AND DECORATIVE VEHICLE BODY PANELS

BACKGROUND OF THE INVENTION

1. Field of the Invention

The present invention relates to the field of vehicle aftermarket products, in particular, to a kit comprising large protective and decorative panels that conform to the general shape of sections of the exterior surface of a vehicle body. The panels can be easily and conveniently attached to and removed from the vehicle body to improve the aesthetics of the vehicle and to provide increased protection against scratches and dents to the underlying body structures.

2. Description of the Related Art

Vehicles are typically provided with an exterior body both to conceal and protect underlying mechanical assemblies and to provide an attractive appearance to the vehicle. The body also defines an enclosed interior compartment for the operator and passengers and frequently an enclosed or open storage area. Such vehicles are typically equipped with doors to facilitate access into the interior of the vehicle. The body and doors are typically made of at least one of sheet steel, aluminum, fiberglass, and plastic. The body and doors are also typically painted in the case of sheet metal or fiberglass material or provided with intrinsic coloring in the case of plastic. The paint serves to protect underlying materials from corrosion/deterioration and from exposure to harmful environmental conditions such as ultraviolet light, rain, and smog.

Some car manufacturers provide the exterior surface of the car with the look of wood. Vehicles with such wood exterior appearances are popularly referred to as "Woodys". This is typically done by applying contact paper, or appliques, having a wood grain design to the exterior surface of the car doors and body. However, these contact papers offer very limited protection against scratching the underlying body panel and paint and essentially no protection against denting, UV light, and rain. As such, the "woody" appearance created by these papers tend to fade, peel, and otherwise deteriorate over time.

Moreover, wood grain pattern contact papers and appliqués are extremely difficult to apply in large sheets to cover the relatively large vertical surfaces of many vehicles without creating creases, air bubbles, tears, and the like in the appliqué material. This often adds to the time and cost of creating the woody appearance. Furthermore, when applied to convex areas on the vehicle body, the contact papers tend to create high stress areas that are susceptible to damage and cracking over time. Moreover, the contact paper or appliques are also typically bordered with multi-part trim pieces that further increase the time and cost of application.

From the forgoing it can be appreciated that there is a need for protective and decorative vehicle panels that can be conveniently applied to existing vehicles and includes authentic wood grain appearance that does not deteriorate over time. There is a need for panels that are resilient so as to offer protection from scratching and denting to underlying structures. There is a further need for panels that can be formed in complex shapes to better accommodate existing and future vehicle designs and for panels that are formed in a single piece to reduce the time and expense of applying the panels to a vehicle.

SUMMARY OF THE INVENTION

In one aspect, the preferred embodiments of the present invention provide a pre-assembled aftermarket kit for converting the exterior appearance of a vehicle. The kit comprises a plurality of individual pieces, each piece having a rigid substrate that is contoured to match an exterior surface of the outer panels of the vehicle. Preferably, the substrate has a decorative and protective finish and is sized so as to distribute force exerted against the individual pieces over the area of the individual piece so as to protect the underlying outer panels of the vehicle. The kit also comprises a plurality of attachments that attach the plurality of individual pieces to the underlying outer panels of the vehicle. In one embodiment, the individual pieces include a door piece that is adapted to mount to the exterior surface of a car door so as to cover the exterior surface of the door. In another embodiment, the door piece is dimensioned so as to cover at least approximately ⅓ of the portion of the door below a window on the door. Preferably, the exterior surface of the substrates of the individual pieces has a wood-grain appearance.

In another aspect, the preferred embodiments of the present invention provide a method for making aftermarket conversion of the exterior appearance of a vehicle. The method comprises providing a plurality of individual pieces. Preferably, each piece comprises a rigid polymeric substrate, a decorative layer, and an outer protective layer and each individual piece is contoured to match a region of the exterior surface of the vehicle. The method further comprises mounting the individual pieces to the respective regions of the exterior surface of the vehicle in a manner such that an interior surface of the substrate of each piece is positioned adjacent the exterior surface of the vehicle. In one embodiment, the step of providing the individual pieces comprises joining together the substrate, decorative, and outer protective layers via a first process so as to form a single-piece panel, followed by thermo-vacuum forming the panel to match the contours of the respective region of the vehicle. In another embodiment, the step of providing the individual pieces comprises contouring the substrate using a first process to match the contours of the respective region of the vehicle, joining together the decorative and outer protective layers into a combined layer using a second process, and contouring the combined decorative and protection layer to match the contours of the substrate. In this embodiment, the mounting step comprises first mounting the substrate to the vehicle, followed by mounting the combined decorative and protect layer to the substrate.

In yet another aspect, the preferred embodiments of the present invention provide a protective and decorative one-piece vehicle exterior body panel. The panel comprises a rigid and resilient material, a decorative layer, and a transparent protective layer. Preferably, the decorative layer is interposed between the substrate and the protective layer wherein the substrate, decorative, and protective layers are combined and contoured to form the one-piece panel. Preferably, the panel is rigid, resilient, and unitized and such that the panel has a three-dimensional contour including at least one of concave and convex curves so as to conform to and be removably attached to existent body structure of a vehicle. Preferably, the decorative layer comprises a wood-grain appearance and the protective layer provides the decorative layer protection against impinging ultraviolet radiation.

Advantageously, the panels may be shaped to match the contour of the existent body panels. The panels are formed from a thin sheet, but are shaped to have a three-dimensional profile that matches the outer profile of a real wood body panel. However, comprising thin material, the panels are lighter and much more robust than an equivalent wood panel. They are provided to be resistant to UV radiation and are much less susceptible to environmental degradation than wood alone is. The panels are also made of sufficient thickness to offer substantially better protection against scratching and denting than simple sticker appliques. These and other objects and advantages will become more apparent from the detailed description as follows.

DETAILED DESCRIPTION OF THE PREFERRED EMBODIMENT

Reference will now be made to the drawings wherein like numerals refer to like parts throughout. The preferred embodiments of the present invention provide a pre-assembled aftermarket kit for decorating and protecting exterior vehicle bodies. Preferably, the pre-assembled kit comprises large single-piece, protective and decorative vehicle body panels that are configured to be readily mounted to sections of the exterior vehicle body.

Figure 1:
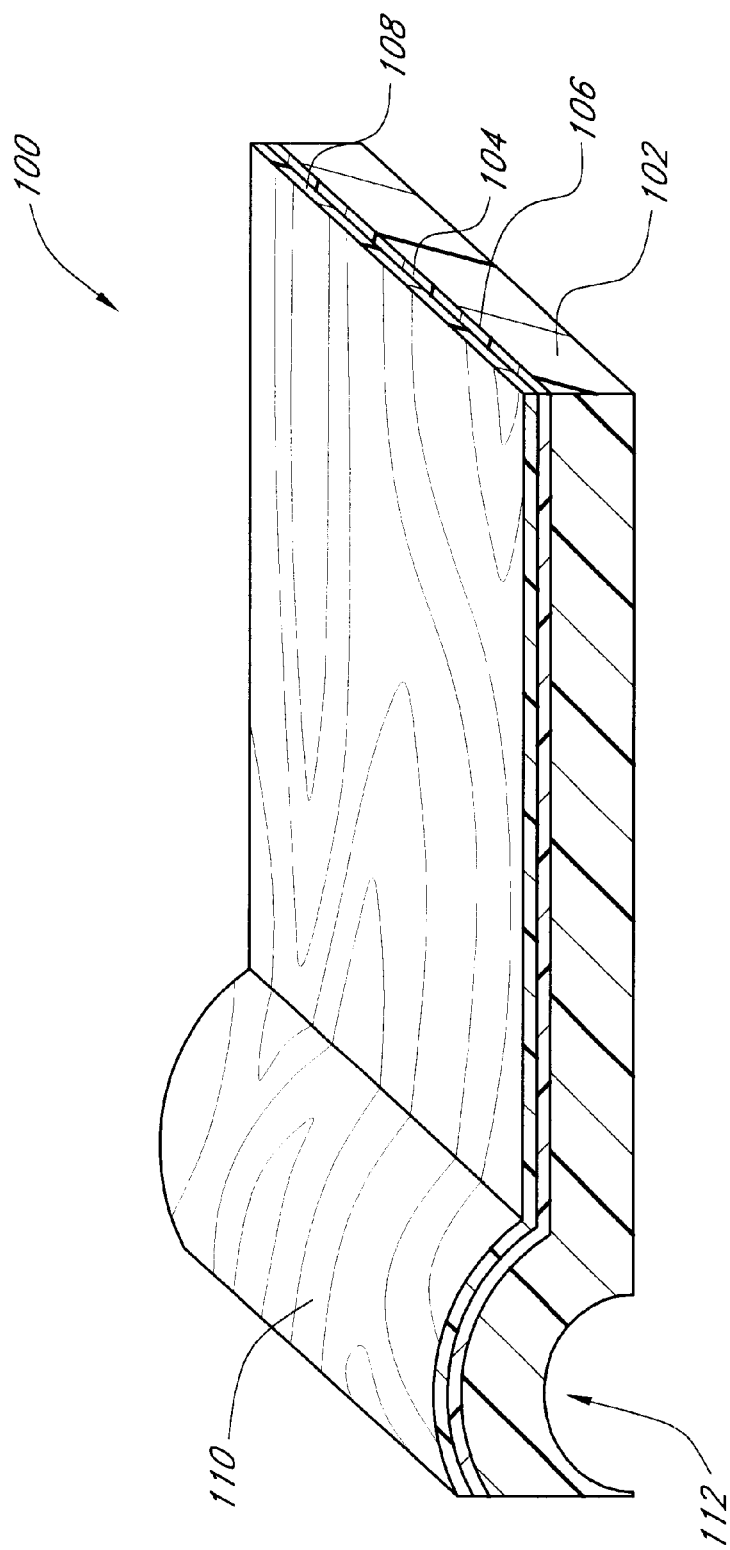
FIG. 1 is a perspective cross-sectional view of one embodiment of a protective and decorative vehicle body panel provided as part of a pre-assembled aftermarket kit of the present invention.

FIG. 1 is a perspective view of one embodiment of a decorative and protective vehicle body panel 100 provided as part of the pre-assembled kit. As shown in FIG. 1, the panel 100 is a substantially planar structure configured to conform to a generally vertical region of an exterior vehicle body. In one embodiment, the panel 100 comprises a rigid and resilient substrate 102 that can be formed by a variety of known processes. In one embodiment, the substrate 102 comprises a polymeric material such as ABS plastics. Preferably, the substrate is less than 5 mm thick, more preferably about 2 mm thick.

As FIG. 1 further shows, the panel 100 also comprises a decorative layer 104 that is formed on an upper surface 106 of the substrate 102. In one embodiment, the decorative layer 104 comprises a colored and/or patterned film providing, for example, a wood-grain design. The decorative layer 104 may comprise a thin plastic having a wood-grain appearance. However, the decorative layer 104 is not limited to the wood-grain appearance and may include any other imprinted designs, including advertisement signage or lettering. In other embodiments, the decorative layer 104 has a carbon fiber or brushed aluminum appearance. In yet other embodiments, the decorative layer 104 is a thin veneer of wood, carbon fiber material, or metal film. It will be appreciated that the preferred material for the decorative layer 104 can vary in specific applications as market demands and the cost and availability of different materials vary. The preferred choice will be readily apparent to one of skill in the art. The presence of the rigid substrate 102 with the decorative layer 104 attached thereto facilitates the use of thin decorative layers 104 of materials such as wood, carbon fiber, or the like that would otherwise lack sufficient strength for use as protective panels.

As also shown in FIG. 1, the panel 100 further comprises a protective layer 108 that is applied over the decorative layer 104 such that the decorative layer 104 is interposed between the substrate 102 and the protective layer 108. In one embodiment, the protective layer 108 is substantially transparent and provides a high gloss finish to the panel 100. Preferably, the protective layer 108 improves the luster of the panels 100 to an observer. In alternative embodiments, the protective layer 108 can be formulated to provide a matte appearance to the panels 100 if market conditions require the same. Preferably, the protective layer 108 is made from commercially available UV resistant materials so as to provide the panel 100 increased resistance to ultraviolet radiation. Preferably, the protective layer 108 is approximately 1 mm thick.

The substrate 102, decorative 104 and protective 108 layers are joined together to form a unitized one-piece, substantially rigid panel 100. In one embodiment, a three step extrusion process can be used to join the layers together. In another embodiment, a lamination process can be used to join the layers together. In yet another embodiment, the patterns of the decorative layer 104 can be pre-printed on the substrate 102 so that the substrate 102 only needs to be joined to the protective layer 108. After the substrate 102, decorative 104, and protective 108 layers are bonded together, the panel 100 is subsequently molded to conform to the contours of a selected region of an exterior vehicle body. In one embodiment, a thermo-vacuum forming process is used to form desired contours in the panel 100. Preferably, the panel 100 is light weight and less than approximately 5 mm thick.

With the decorative layer 104 thermo-vacuum-formed along with the substrate 102 in some embodiments, the decorative layer 104, even comprising thin wood or carbon fiber veneers, can be formed into sharply concave and convex curves that would tend to tear or induce bubbling in an unsupported decorative layer. In some embodiments, the substrate 102 can be provided in different colors to modify the visual appearance of the overlying decorative layer 104 and thus the panel 100. For example, a substrate having a white or other light color will tend to make the panel 100 appear brighter and lighter in color while a substrate 102 having a black or darker color will tend to correspondingly darken the appearance of the panel 100.

Advantageously, the panel 100 can be formed into complex three-dimensional curves and contours that resemble shaped wood panels, however at a much reduced weight and cost as compared to plain wood. It will be appreciated that veneers of authentic material such as wood or carbon fiber may be more expensive to provide and work with than the panels 100 of the preferred embodiments having similar decorative appearances. As can be seen in FIG. 1, the panel 100 can define an exterior rib portion 110 opposite an interior cavity 112. This oppositely opposed rib portion 110 and cavity 112 provide the appearance of shaped wood ribs, yet the cavity 112 provides significant weight savings. It should be understood that the view shown in FIG. 1 is one embodiment illustrative of the relative positioning of the substrate 102, decorative 104 and protective 108 layers only and should not be considered to be to scale.

Figure 2:
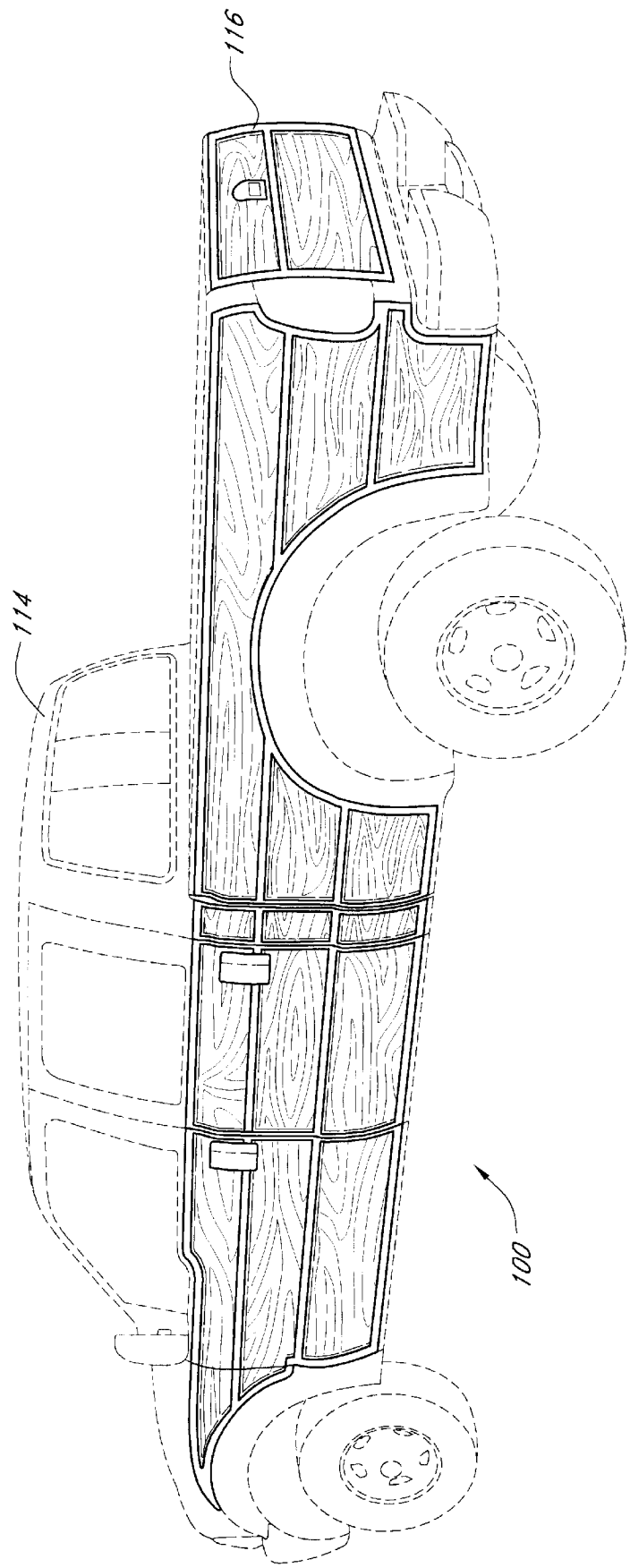
FIG. 2 is a perspective view of a vehicle provided with one embodiment of the protective and decorative vehicle body panels wherein the panels cover generally the full extent of the vertical body region.

As shown and described above, the panel 100 comprises a single-piece assembly constructed of a resilient, rigid material. Preferably, the panels 100 are adapted to be removably secured to an existing vehicle body structure 114 as shown in FIG. 2. As such, the panels 100 on the vehicle can be easily replaced with panels of different designs. Moreover, the panels 100 can be easily removed prior to selling the vehicle if the decorative designs are not to the taste of the new owner. This feature is particularly advantageous for vehicles that display advertisement signage on its exterior body. Conventionally, to remove most advertisement signage on a vehicle, the design is typically chemically stripped and the vehicle repainted, which can be a costly process. In the preferred embodiment, however, the panels 100 containing the signage can be simply removed from its fastening means and the outer surface of the vehicle is thus restored to its original condition. Furthermore, in some embodiments, the decorative and protective layers may be pre-assembled separately from the substrate. For example, the decorative and protective layers can be first joined into a combined layer and contoured to match the contour on the substrate. The contoured substrate is mounted to the vehicle before mounting the pre-assembled decorative and protective layer onto the substrate.

In addition to improving the aesthetic appearance of the vehicle 114, the panels 100 also provide protection to the vehicle 114 from impacts with flying debris, car doors, shopping carts, and other impacts that might otherwise scratch and/or dent a vehicle not provided with the panel 100. In one embodiment, the panels are semi-permanently attached to the vehicle 114 via attachment means, such as double-sided adhesive tape in a manner well understood in the art. However, in alternative embodiments, the panels can be attached via hook-and-loop fastener, glue, or other techniques for attaching separate pieces. It is preferred for the protective aspects of the invention, that the panels 100 be at least 85% adjacent the underlying vehicle body structure, i.e. that the panels conform closely to the contour of the underlying body and not extend substantially therefrom.

As can be seen in FIG. 2, the panels 100 of this embodiment extend substantially over the full extent of the generally vertical surfaces of the vehicle 114. In the embodiment illustrated in FIG. 2, the panels 100 substantially cover the fixed portions of the doors of the vehicle 114, i.e. those portions of the doors below the movable window portions. The panels 100 also substantially cover the vertical extent of the bed and tailgate 116 of the vehicle 114. It can be seen that the generally vertical surfaces of the vehicle 114 are positioned generally on the outer perimeter of the vehicle 114. Thus, the panels 100 positioned on these generally vertical surfaces, are positioned at the outer perimeter of the vehicle 114 which is the area of the vehicle 114 most likely to suffer impacts with other objects. For example, a shopping cart or other vehicle moving in a parking lot is much more likely to hit the outer perimeter of the vehicle 114 than the roof or window areas. The substrate 102 of the panels 100 of this embodiment has sufficient strength and resiliency to absorb many impacts without suffering permanent deformation. In addition, the panels 100 spread out impacts such that the force is distributed across a greater area thus reducing the magnitude of force applied at the point of impact. This helps protect underlying surfaces of the vehicle 114 over which the panels 100 are affixed against denting and scratching.

While FIG. 2 illustrates panels 100 positioned on the lateral sides and the rear of the vehicle 114, it should be appreciated that in alternative embodiments, the panels 100 can be positioned on the roof, front, or other generally horizontal surfaces of the vehicle 114. It will be appreciated that the panels 100 should not be positioned so as to occlude airflow from ventilation ducts or cooling air passages. The exact preferred placement of the panels 100 on any given vehicle will be readily apparent to one of skill in the art and it is anticipated that appropriate placement of the panels 100 can vary due to individual preferences and vehicle design. It should also be appreciated, that while the panels 100 have been described in the context of a vehicle 114 comprising a pick-up, vehicle 114 also comprises other conveyances such as cars, boats, motorcycles, aircraft, and un-powered or animal powered conveyances.

Figure 3:
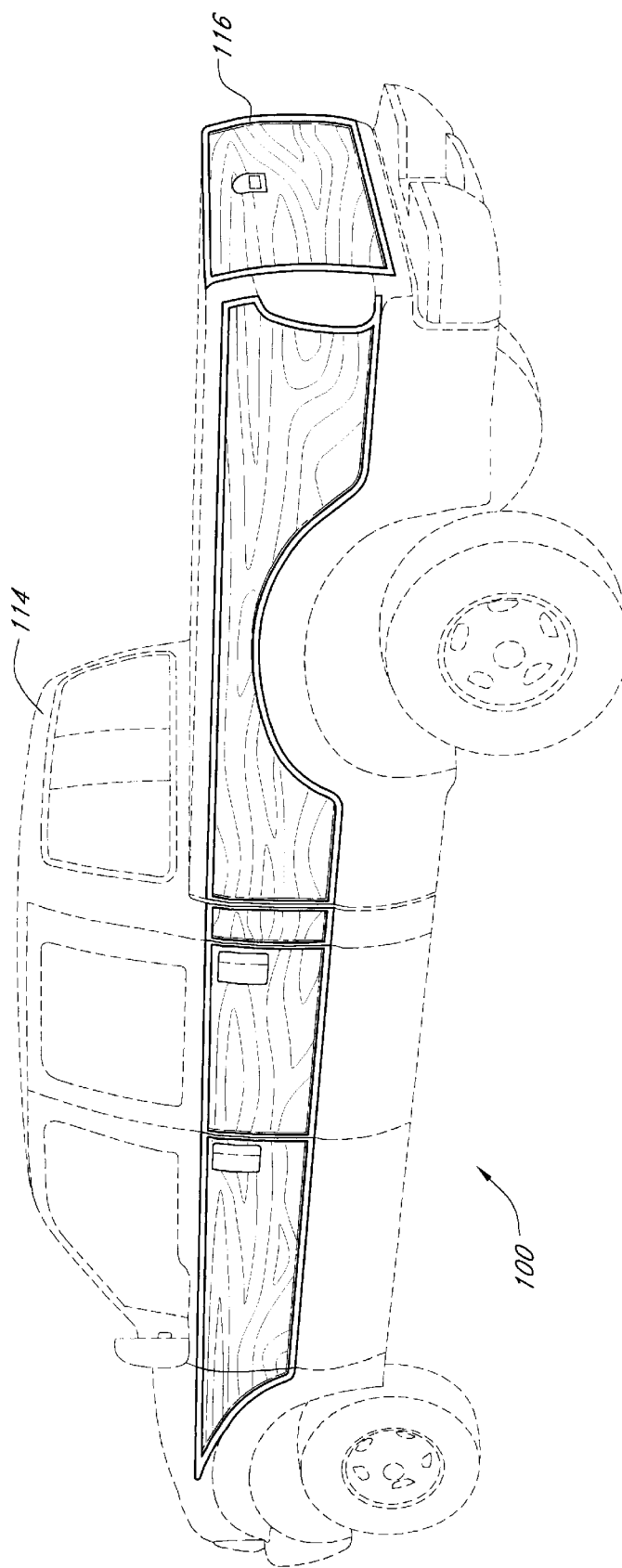
FIG. 3 is perspective view of a vehicle provided with an alternative embodiment of the protective and decorative vehicle body panels wherein the panels cover only the upper vertical surfaces of the vehicle body.
Figure 4:
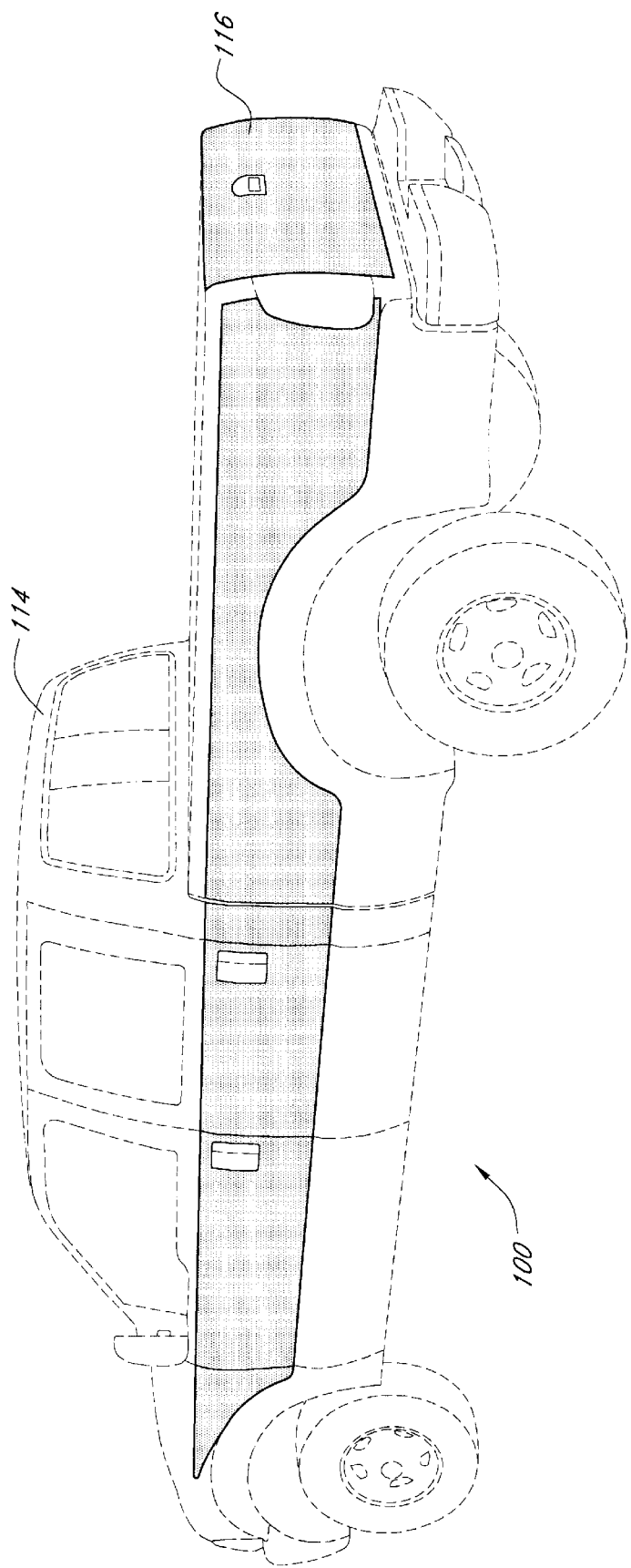
FIG. 4 is a perspective view of a vehicle provided with yet another embodiment of the protective and decorative vehicle body panels which are similar in contour to the vehicle body panels of FIG. 3, but with a carbon fiber appearance.

FIGS. 3 and 4 illustrate alternative embodiments of the panels 100. In these embodiments the panels 100 cover the upper portions of the generally vertical surfaces of the vehicle body. The embodiment of FIG. 3 retains the wood grain appearance of the panels of FIG. 1 while the panels 100 of FIG. 4 have a carbon fiber appearance. The panels 100 of FIGS. 3 and 4 may be preferred in applications wherein the vehicle 114 is previously or subsequently provided with a two-tone paint scheme.

It should be appreciated that the panels 100 being of one-piece rigid construction can be more easily and quickly applied to the vehicle 114 than the conventional contact paper, appliqués and trim pieces or than separate wood panel pieces. The panels 100 are applied by simply exposing/applying the attachment means, lining up the panels 100 with the corresponding vehicle 114 body region, and attaching the panels 100 to the vehicle 114. It has been found that a complete set of the panels 100 can be applied to a vehicle 102 as illustrated in FIG. 2, 3, or 4 in one to two hours as opposed to the one to two days typically required to apply a contact paper or appliqué set. In certain applications, it is preferred that the panels 100 and attachment means be provided in a pre-assembled kit form to facilitate retail sales and aftermarket installation of the panels 100 to vehicles 114.

Advantageously, the pre-assembled kit of the preferred embodiment significantly simplifies the process of providing large sections of the exterior vehicle body with a decorative design, such as the "woody" look. The panels in the kit can be easily and conveniently installed on a vehicle without the skill or expertise of a professional. Furthermore, the panels provided by the pre-assembled kit do not deteriorate even after long-term exposure to sun and rain. Unlike the conventionally used contact papers and appliqué, the panels are not susceptible to peeling or bleaching and protect the vehicle body from minor scratches and dents. The panels can be easily removed from the exterior vehicle body and interchanged with panels of various other designs.

Although the foregoing description of the preferred embodiment of the present invention has shown, described, and pointed out the fundamental novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. A pre-assembled aftermarket kit for converting the exterior appearance of a vehicle, comprising:

a plurality of individual pieces having a rigid substrate, wherein each of the substrate of the plurality of individual pieces are contoured to match an exterior surface of the outer panels of the vehicle, wherein an exterior surface of said rigid substrate has a wood-grain appearance and protective finish, wherein said rigid substrate is sized so as to distribute force exerted against the individual pieces over the area of the individual pieces so as to protect the underlying outer panels of the vehicle; and a plurality of attachments that attach the plurality of individual pieces to the underlying outer panels of the vehicle.

2. A pre-assembled aftermarket kit for converting the exterior appearance of a vehicle, comprising:

a plurality of individual pieces having a rigid substrate, wherein each of the substrate of the plurality of individual pieces are contoured to match an exterior surface of the outer panels of the vehicle, wherein an exterior surface of said rigid substrate has a brushed aluminum appearance and protective finish, wherein said rigid substrate is sized so as to distribute force exerted against the individual pieces over the area of the individual pieces so as to protect the underlying outer panels of the vehicle; and a plurality of attachments that attach the plurality of individual pieces to the underlying outer panels of the vehicle.

3. A pre-assembled aftermarket kit for converting the exterior appearance of a vehicle, comprising:

a plurality of individual pieces having a rigid substrate, wherein each of the substrate of the plurality of individual pieces are contoured to match an exterior surface of the outer panels of the vehicle, wherein an exterior surface of said rigid substrate has a decorative layer comprising a thin film having colored and patterned designs and a protective layer, wherein said rigid substrate is sized so as to distribute force exerted against the individual pieces over the area of the individual pieces so as to protect the underlying outer panels of the vehicle; and a plurality of attachments that attach the plurality of individual pieces to the underlying outer panels of the vehicle.

4. A pre-assembled aftermarket kit for converting the exterior appearance of a vehicle, comprising:

a plurality of individual pieces having a rigid substrate, wherein each of the substrate of the plurality of individual pieces are contoured to match an exterior surface of the outer panels of the vehicle, wherein an exterior surface of said rigid substrate has a decorative layer comprising wood and a protective layer, wherein said rigid substrate is sized so as to distribute force exerted against the individual pieces over the area of the individual pieces so as to protect the underlying outer panels of the vehicle; and a plurality of attachments that attach the plurality of individual pieces to the underlying outer panels of the vehicle.

5. A pre-assembled aftermarket kit for converting the exterior appearance of a vehicle, comprising:

a plurality of individual pieces having a rigid substrate, wherein each of the substrate of the plurality of individual pieces are contoured to match an exterior surface of the outer panels of the vehicle, wherein an exterior surface of said rigid substrate has a decorative layer comprising carbon fiber material and a protective layer, wherein said rigid substrate is sized so as to distribute force exerted against the individual pieces over the area of the individual pieces so as to protect the underlying outer panels of the vehicle; and a plurality of attachments that attach the plurality of individual pieces to the underlying outer panels of the vehicle.

6. A pre-assembled aftermarket kit for converting the exterior appearance of a vehicle, comprising:

a plurality of individual pieces having a rigid substrate, wherein each of the substrate of the plurality of individual pieces are contoured to match an exterior surface of the outer panels of the vehicle, wherein an exterior surface of said rigid substrate has a decorative layer comprising metal film and a protective layer, wherein said rigid substrate is sized so as to distribute force exerted against the individual pieces over the area of the individual pieces so as to protect the underlying outer panels of the vehicle; and a plurality of attachments that attach the plurality of individual pieces to the underlying outer panels of the vehicle.

7. A method for making aftermarket conversions of the exterior appearance of a vehicle, comprising:

providing a plurality of individual pieces, wherein providing said plurality of individual pieces comprises joining together a rigid polymeric substrate, a decorative layer, and an outer protective layer via a first process so as to form a single-piece panel, followed by molding the panel to match the contours of the respective region of the exterior surface of the vehicle; and mounting the individual pieces to the respective regions of the exterior surface of the vehicle in a manner such that an interior surface of the substrate of each said piece is positioned adjacent the exterior surface of the vehicle.

8. The method of claim 7, wherein molding the panels comprises using a thermo-vacuum forming technique.

9. The method of claim 7, wherein the first process comprises an extrusion process.

10. The method of claim 7, wherein the first process comprises a lamination process.

11. A method for making aftermarket conversions of the exterior appearance of a vehicle, comprising:

providing a plurality of individual pieces, wherein providing said plurality of individual pieces comprises contouring a rigid polymeric substrate using a first process to match the contours of the respective region of the vehicle, joining together a decorative layer and an outer protective layer into a combined layer using a second process, and contouring the combined layer to match the contours of the substrate; and mounting the individual pieces to the respective regions of the exterior surface of the vehicle in a manner such that an interior surface of the substrate of each said piece is positioned adjacent the exterior surface of the vehicle.

12. The method of claim 11, wherein mounting the individual pieces comprises first mounting the substrate to the exterior surface of the vehicle followed by mounting said combined decorative and protective layer to the substrate.

* * * * *